Patented Apr. 8, 1930

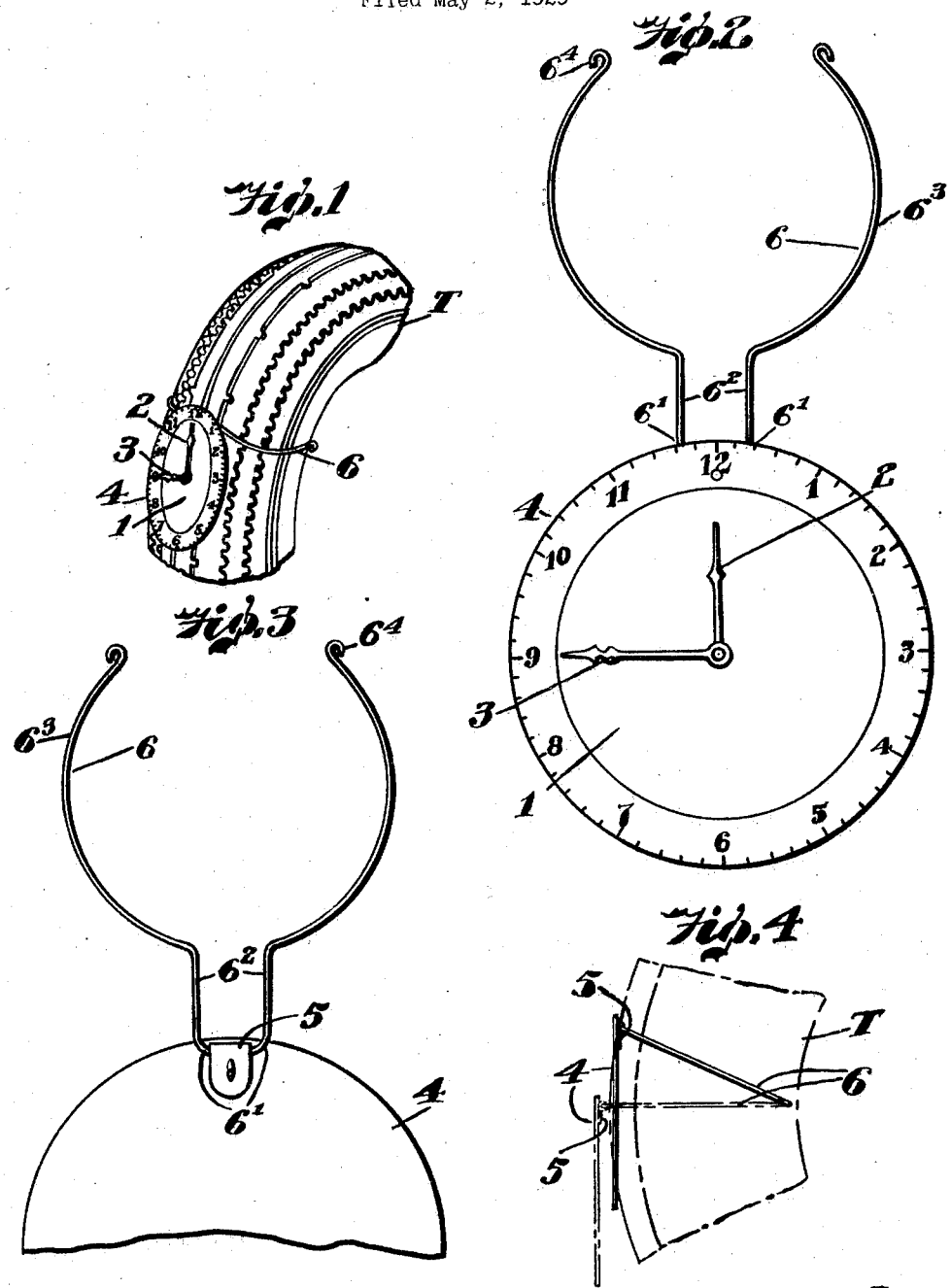

1,754,203

UNITED STATES PATENT OFFICE

FRANCIS W. GIBSON, OF WEST ROXBURY, MASSACHUSETTS

TIME INDICATOR

Application filed May 2, 1929. Serial No. 359,793.

In the tire making and repairing art, as a certain step in the process, it is necessary to subject the tire to a baking process frequently for several hours. In tire factories or vulcanizing shops where a considerable number of tires are being worked upon, it is difficult to provide a suitable and sure record of the hours when each tire was submitted to the baking process and have available a reminder as to when the tire should be removed from the oven. Heretofore, it has been common practice to chalk the time on a board hung above or closely adjacent the tire to which it bore reference, but so far as I am aware no one prior to my invention has provided an indicator which could be attached directly to the tire itself without injury to the tire, and which was adaptable to tires widely varying in cross section without special adjustment of the attaching means.

In the accompanying drawings, I have illustrated an embodiment of my present invention which has been found highly satisfactory in use and has already been adopted extensively in the trade. Throughout the specification and drawings like reference numbers indicate corresponding parts.

In the drawings:—

Fig. 1 is a fragmentary view of a tire showing my indicator in place thereon.

Fig. 2 is a front view of my display indicator showing the tire attaching member swung to vertical position.

Fig. 3 is a rear view thereof, particularly showing the hinge connection between the indicator and the tire clamping member.

Fig. 4 is a side view showing my indicator in place on a section of tire, but hanging at a different angle with relation thereto than that illustrated in Fig. 1, and illustrating the adjustability of my device to tires of varying cross section.

My device is adaptable to tires of widely varying cross section without special adjustment and regardless of the size of tire to which it is applied, firmly clamps the time-indicator thereto in conveniently readable position for the operative.

I have indicated generally at T a section of tire of standard manufacture.

My indicator comprises a dial area 1 which is provided with an hour hand 2 and minute hand 3 rotatable over the usual hour and minute indicia 4 on the front face of the dial.

On its rear face, I provide the indicator adjacent the perimeter thereof and preferably opposite the notation of the hour twelve, with means as at 5 for flexibly connecting the indicator to the tire engaging member 6. Such means 5 may be a simple hinge loop on which the member 6 freely swings through an arc of 180°, so that it may be folded down flatly against the rear face of the dial when the device is not in use or packed for shipment.

My tire engaging member is made of a piece of ordinary spring wire so formed or bent upon itself as to provide oppositely disposed spaced tire engaging arms. The member 6 at the portion 6' forms the pintle movable within the hinge 5. On either side of the hinge connection the wire is bent to form two spaced arms $6^2$ extending rearwardly from the hinge substantially parallel to each other for a distance sufficient adequately to space the dial from the tread of the tire when the indicator is applied thereto (see Fig. 4). From the arms $6^2$ the clamp extends as a pair of oppositely bowed arcuate arms $6^3$ adapted to snap over the partially encircle the tire. At their extreme ends the arcuate arms $6^3$ are bent back upon themselves as at $6^4$ to avoid sharp ends. Being oppositely curved and yieldable these arms enable the device to be attached to a wide range of tires without adjustment.

In use, the workman springs the arms $6^3$ of the indicator over the tire which is about to be subjected to the baking process. This positions the face of the indicator substantially vertically and in convenient reading position, so that by simple turning the hands to the time at which the tire should be removed from the oven, he can tell at a glance when the curing time will expire.

It will be noted that regardless of the size of the tire or of the angle at which the spring arms $6^3$ encircle the tire the indicator always maintains substantially vertical position. This is indicated somewhat diagrammatically in Fig. 4 wherein the spring arms are shown as applied to the tire in several different positions, in each of which however the dial assumes a vertical position and hence is readily readable.

It will be understood that the shape of my indicator as well as the means for connecting the same to the tire engaging member and the tire engaging member itself may be widely varied without departing from the spirit of my invention if within the limits of the appended claims.

What I therefore claim and desire to secure by Letters Patent is:

1. A time indicator having a time dial adapted for use on a tire comprising a dial member adapted to be positioned over the curved tread of the tire in offset relation thereto, and means for maintaining said time indicator in vertical position with reference to the tread of said tire, said means comprising a pair of spring arms adapted to be sprung over the tire and spaced from each other by a pintle portion adapted to be engaged with said dial member adjacent the edge thereof.

2. A time indicator having a time dial adapted for use on a tire comprising a dial member adapted to be positioned over the curved tread of the tire in offset relation thereto, and means for maintaining said time indicator in vertical position with reference to the tread of said tire, said means comprising a pair of spring arms adapted to be sprung over the tire in predetermined position to permit the dial to hang vertically.

In testimony whereof I affix my signature.

FRANCIS W. GIBSON.